United States Patent
Bachmann et al.

[11] Patent Number: 4,732,413
[45] Date of Patent: Mar. 22, 1988

[54] EXPANSION JOINTS

[75] Inventors: Lothar Bachmann, Auburn; William F. Koch, Lewiston, both of Me.

[73] Assignee: Bachmann Industries, Inc., Lewiston, Me.

[21] Appl. No.: 897,330

[22] Filed: Aug. 18, 1986

Related U.S. Application Data

[63] Continuation-in-part of Ser. No. 773,608, Sep. 9, 1985, abandoned, which is a continuation-in-part of Ser. No. 584,246, Feb. 27, 1984, abandoned.

[51] Int. Cl.⁴ .............................................. F16L 11/12
[52] U.S. Cl. ..................................... 285/49; 285/229; 285/236
[58] Field of Search .............. 285/149, 229, 235, 236, 285/49

[56] References Cited

U.S. PATENT DOCUMENTS 4,289,338 9/1981 Cook ................................... 285/229
4,403,796 9/1983 Ledbetter et al. ................... 285/223

FOREIGN PATENT DOCUMENTS 255125 10/1964 Australia .
7710500 3/1978 Netherlands ....................... 285/235
1556948 12/1979 United Kingdom .

Primary Examiner—Dave W. Arola

[57] ABSTRACT

The proximate ends of spaced apart sections of duct systems for fluid media are interconnected by expansion joints having a sleeve of flexible material surrounding and isolating the flow path in the area between the sections. The flexible material consists of at least one reinforcing substrate to which surface layers of a media resisting material having a degree of elasticity are fused and bonded. Each substrate in one embodiment consists of two series of strands oriented to present a criss-cross pattern with the strands of both series diagonally disposed with with respect to the flow path when the material is formed into a sleeve. In another embodiment, there is an additional series of strands which are longitudinal.

13 Claims, 14 Drawing Figures

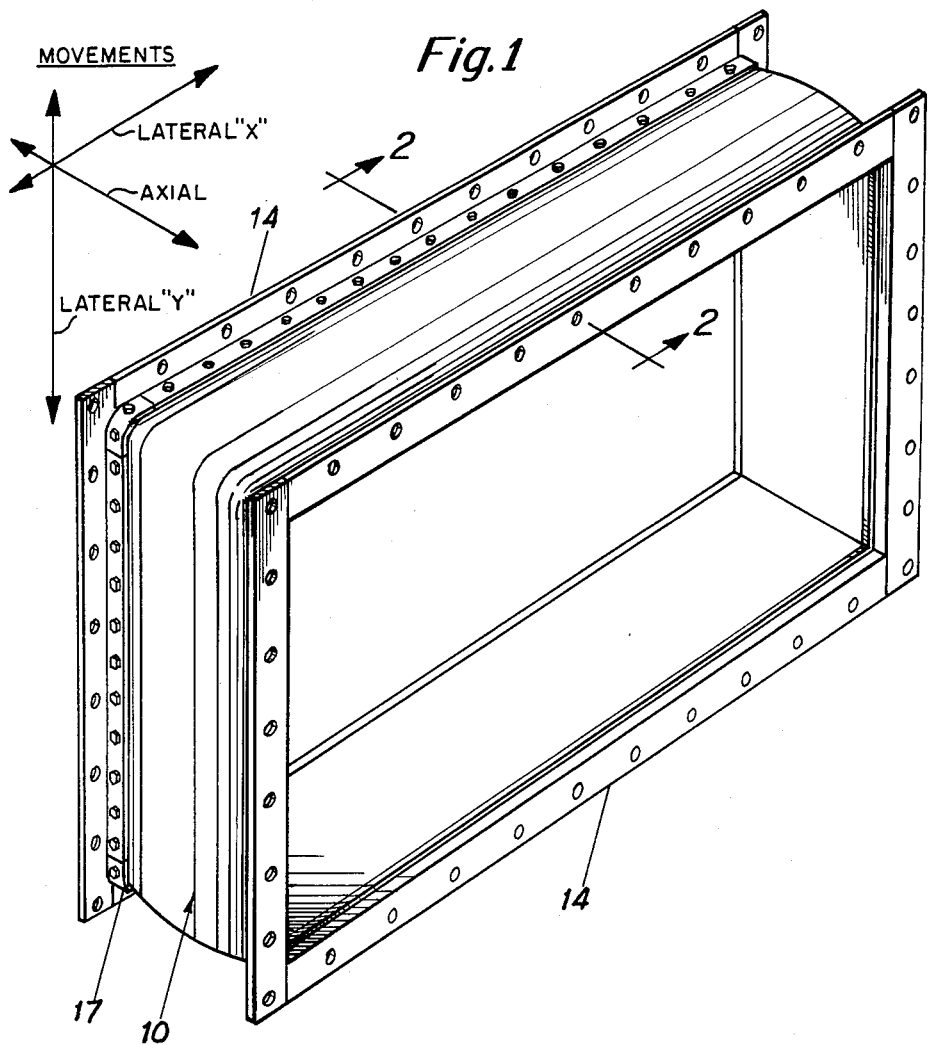
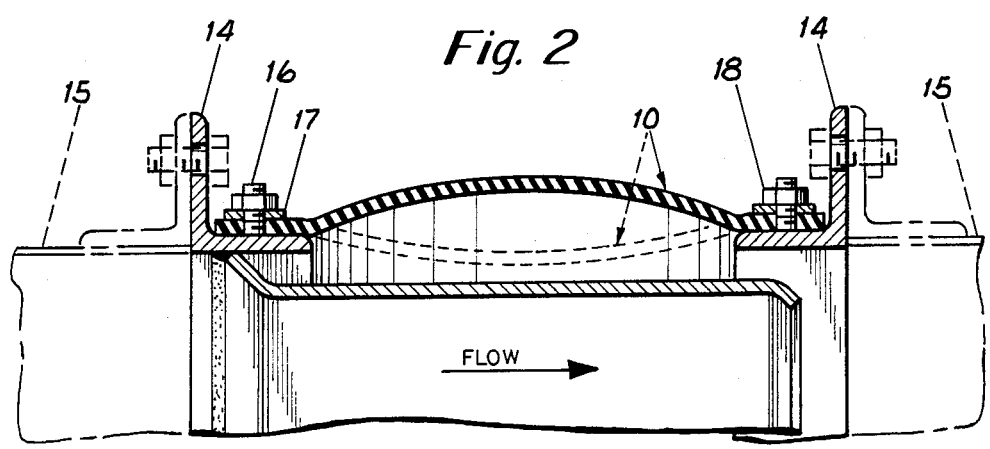

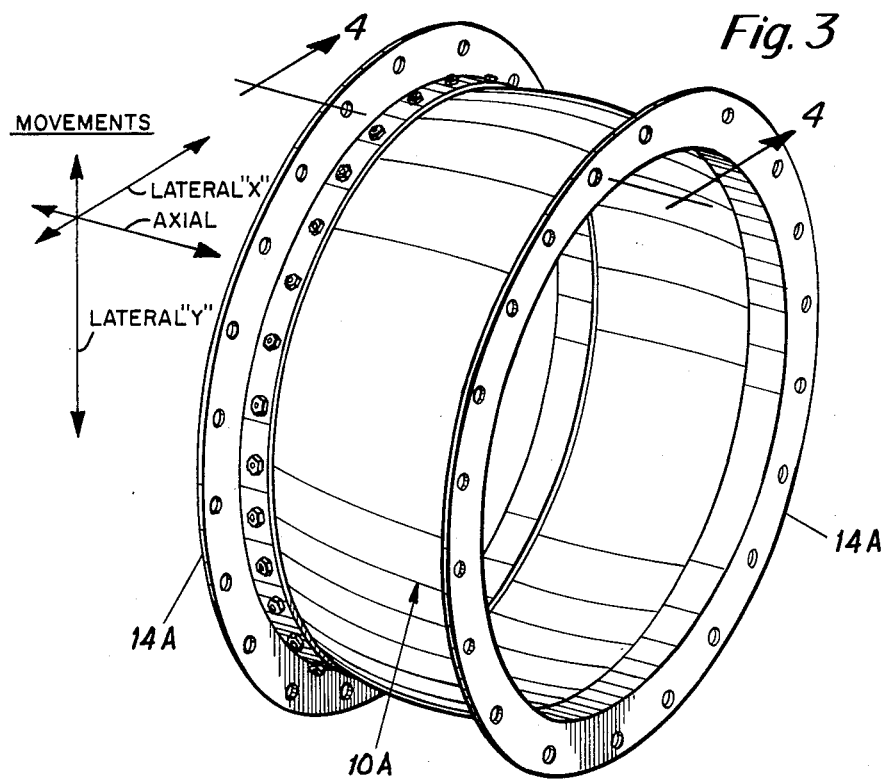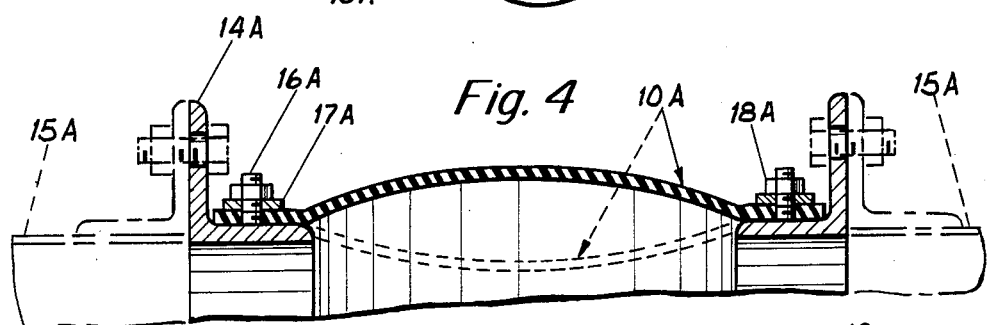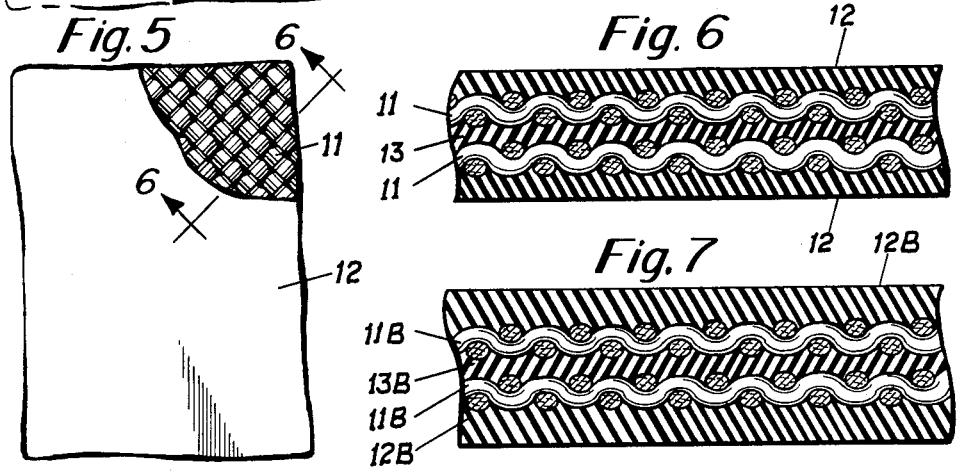

EXPANSION JOINTS

The present application is a continuation-in-part of application Ser. No. 773,608, filed Sept. 9, 1985, which was a continuation-in-part of Ser. No. 584,246, filed Feb. 27, 1984, and now both abandoned.

BACKGROUND OF THE INVENTION

Expansion joints for use in coupling spaced apart sections of duct systems for fluid media, whether the ducts are square or circular in cross section, have structural connections with the proximate ends of such sections and a sleeve of flexible material sealed to the connections with the purpose of surrounding and isolating the flow path in the area between the section. The sleeve materials have at least one reinforcing woven substrate to which elastomeric surface layers are bonded.

In an installed expansion joint, the material is normally bowed to accommodate expansion and contraction forces, inwardly when a subatmospheric pressure prevails in a duct system and outwardly when the duct pressures are positive.

The problem that exists with presently used sleeves is that the strands of whatever materials are used to form the substrate or substrates are incapable of responding to the demands for their extension or reduction which are attended by the outward and inward transverse bowing associated with varying duct temperatures and pressures. As a consequence, the integrity of the sleeves is often adversely affected by the compound wrinkles and bends which develop in service with rupturing of the bonds between the substrates and the elastomeric layers being one result and the cutting of the layers when the substrates are wires being another. Wire substrates of the knitted type incorporating a loop profile have the objection that the wire loops are required to straighten beyond their elastic limits when subjected to such perimetric changes typically required.

THE PRESENT INVENTION

The general objective of the present invention is to provide expansion joints for the previously summarized uses which utilize sleeves, the materials of which accommodate the expansion and contracting forces which hithertofor have been responsible for shortening the useful lives of installed expansion joints.

In accordance with one embodiment of the invention, this objective is attained with expansion joints which are or may be conventional except for their sleeves. In accordance with the invention, each sleeve material has at least one reinforcing substrate having two series of strands the orientations of which present a criss=cross pattern with the strands of both series, when the material is formed into a sleeve, diagonal with respect to the intended flow path therethrough.

In another embodiment of the invention, the general objective is attained by employing an additional series of strands which extend longitudinally with respect to the flow path.

The strands may be formed of wire, man made fibers, natural fibers, or blends thereof and the substrates are fabrics with their series of strands woven, knitted, sewn or joined together by any flexible adhesive which possesses sufficient elasticity to withstand the flexing to which the sleeve will be subjected and which is not subject to damage by the media flowing through the sleeve. The woven strands may be of man made fibers, natural fibers, blends thereof or wire. When the strands are not interwoven their lengths in each sleeve are approximately one and one-half times the longitudinal length of the sleeve.

BRIEF DESCRIPTION OF THE DRAWINGS

The accompanying drawings illustrate preferred embodiments of the invention of which -

FIG. 1 is a perspective view of a rectangular expansion joint;

FIG. 2 is a section, on an increase in scale, taken approximately along the indicated line 2—2 of FIG. 1;

FIG. 3 is a perspective view of a circular expansion joint;

FIG. 4 is a section, on an increase in scale, taken approximately along the indicated line 4—4 of FIG. 3;

FIG. 5 is a fragmentary plan of one type of material with an adhesive layer broken away to show the weave of the substrate;

FIG. 6 is a section on an increase in scale, taken along the line 6—6 of FIG. 5;

FIG. 7 is a view similar to FIG. 6 of material having thicker adhesive layers;

THE PREFERRED EMBODIMENTS OF THE INVENTION

Figure 8:
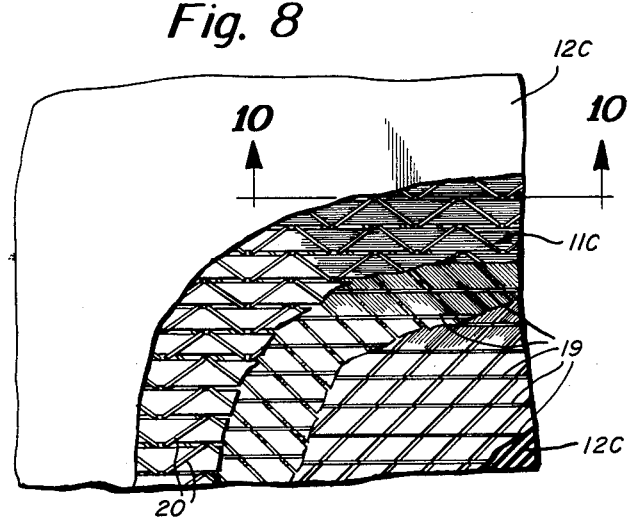
FIG. 8 is a fragmentary plan view of another material in accordance with the invention with an adhesive layer broken away to show the fabric substrate.

As expansion joints in accordance with the invention are or may be conventional except for their sleeves, generally indicated at 10 in FIGS. 1 and 2, and 10A in FIGS. 3 and 4, the sleeve forming material will be described with reference to FIGS. 5-7 prior to describing typical expansion joint installations employing such sleeves.

The sleeve forming material of FIGS. 5 and 6 is shown as having two commercially available substrates 11, each having two series of strands woven together, adhesive surface layers 12 and a relatively thin intermediate layer 13 which is a composite of coats applied to the proximate faces of the substrates 11 to facilitate bonding when the adhesive layers 12 are cured to complete the material. The sleeves are conventionally formed from appropriate lengths of the material by cutting back opposite sides of its ends, each to approximately half thickness to provide overlapping portions which when vulcanized together, form a smooth joint.

There is a wide range of flexible adhesive materials that may be used for the surface layers 12 with the selection of any one dependent on such factors as its cost, its elasticity and its resistance to various fluid media and their temperatures. Such materials include, by way of examples only, hydrocarbon rubber, certain of the synthetic rubbers, chlorobutyl, polyester and fluoroelastomers and fluorocarbon resins. Of the last two named materials, Viton, a product of Dupont de Nemours & Co. and PTFE are, respectively, well adapted for use for present purposes.

Each of the substrates 11 is shown as a fabric having a diagonal weave and in the sleeves 10, 10A, each of the two a series of strands is diagonal with respect to the flow path. The strands of the fabric may consist of wire, natural fibers, synthetic fibers, or blends thereof. For Synthetic fibers, aramids, polyesters, asbestos and fiber glass are useable examples with fiber glass generally preferred.

The material illustrated by FIG. 7 is similar to that just described and accordingly it will not be detailed but corresponding parts are indicated by the same reference numerals distinguished by the suffix addition "B". It will be noted that the layers 12A are thicker than the layers 12 for the purpose, for example, of increased assurance against leakage since most elastomers are gas permeable to a slight degree.

The expansion joint of FIGS. 1 and 2 has two rectangular frames 14 of stock that is right angular in cross section with one wall of each frame bolted and sealed to the flange end of the appropriate one of the duct sections 15 that are to be interconnected by the joint. The margins of the flexible sleeve 10 are seated against the other walls of the frame 14 and are anchored to and sealed thereagainst utilizing threaded studs 16 extending through said margins and a hold down frame 17 to receive anchoring nuts 18. The said margins may be otherwise secured to the frames or duct sections by any other means which results in an integral connection of the sections.

The direction of flow through the expansion joints is indicated by the arrow 19 in FIG. 2. The upstream frame 14 is shown as having a liner 20 welded to each of its sides and offset relative thereto and of a length to extend freely into the down stream frame 14. Such optional liners are often employed for the purpose of shielding the sleeves from the fluid stream.

The expansion joint, illustrated by FIGS. 3 and 4, is of the circular type and is generally similar to that just described and it will not be detailed. Corresponding parts, however, are identified by the same reference numerals distinguished by the suffix addition "A".

In both FIGS. 1 and 3 the direction of expansion and contraction forces are indicated by the arrows X and Y as well as axially of the expansion joint. Forces exerted axially of the joint force perimetric changes in the sleeves and forces causing movements in the direction of the arrows X and Y are sometimes attended by a slight twisting of the sleeves. These movements are accommodated by sleeves in accordance with the invention as their substrates can reorientate their strand axes hence, allowing the adhesive layers to function within their elastic limits without adverse cutting effects or loss of bond; previous substrates not allowing this elastic action due to the existence of perimetric strands of predefined and constant length which do not exist within the sleeve of the present invention. The functioning of the substrates in reinforcing the adhesive material is of course retained with the added function of accommodating perimetric changes in the sleeves in a manner minimizing the risk of damage thereto.

Figure 9:
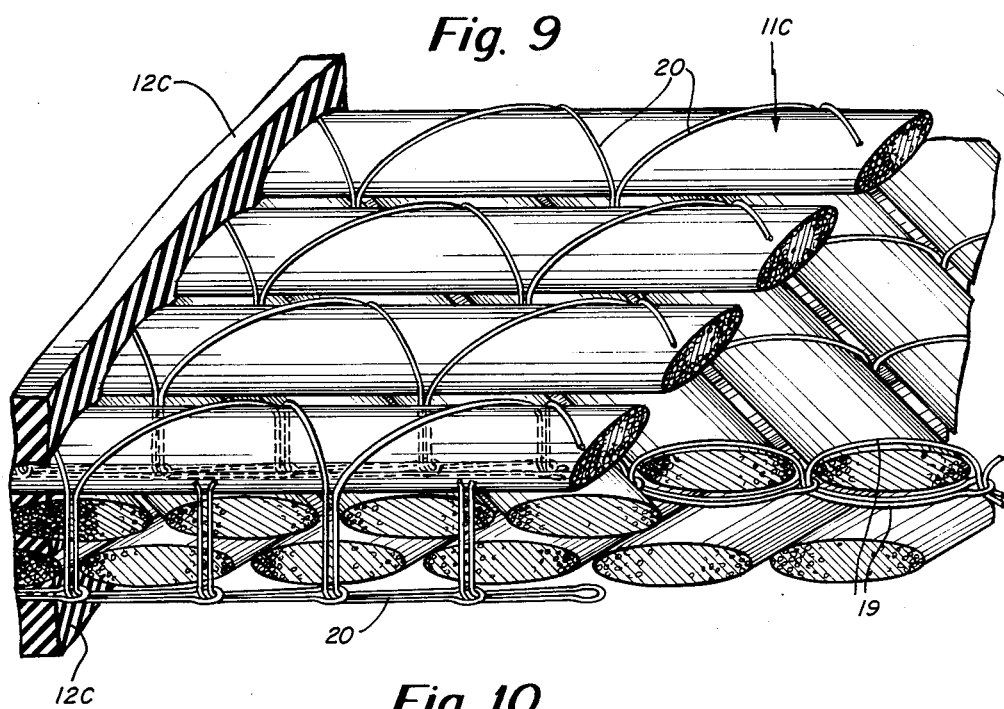
FIG. 9 is an exploded perspective view of the fabric substrate.
Figure 10:
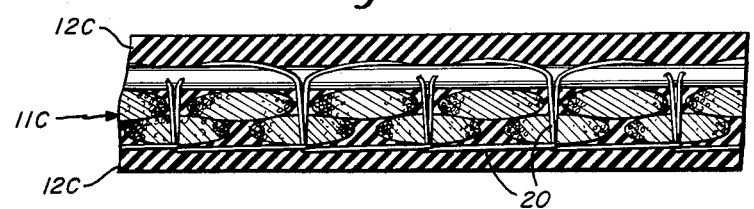
FIG. 10 is a section taken approximately along the indicated line 10—10 of FIG. 8.

Sleeve forming material in accordance with the embodiment of the invention illustrated by FIGS. 8-10 has a fabric substrate 11C having three series of parallel strands, typically of fiber glass, with the strands of each series united by lines of stitching 19 and the three series joined together by knitted threads 20. The material is completed by providing the fabric substrate 11C with adhesive coats 12C and the substrate 11C may first be saturated with the same or another compatible elastomer. It will be noted that two of the series of strands are arranged in a criss-cross pattern and when the material is formed into a sleeve, the strands are diagonal with respect to the longitudinal axis thereof and that the strands of the third series are parallel to that axis and provide reinforcement for the strands of the other two series.

Figure 11:
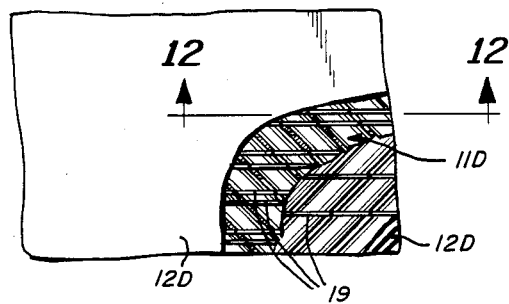
FIG. 11 is a fragmentary plan view similar to FIG. 8 showing yet another material in accordance with the invention.

Sleeve forming material in accordance with the embodiment of the invention illustrated by FIG. 11 is generally similar to that just described except that it does not include the third series of strands, and, accordingly, corresponding parts are designated by the corresponding reference numerals which are distinguished by the suffix addition "D".

Fabrics for the substrate for the materials of FIGS. 8-11 are commercially available and a suitable source for them is Knytex Inc. of Sequin, Texas.

Figure 12:
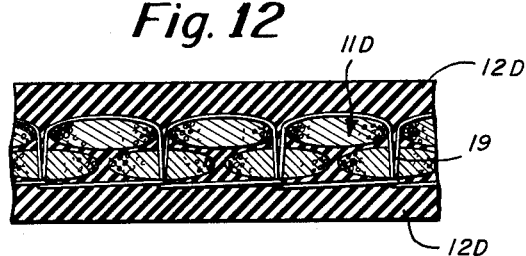
FIG. 12 is a plan view of another fabric substrate in accordance with the invention.
Figure 13:
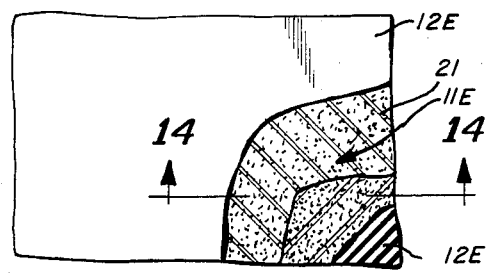
FIG. 13 is a section taken approximately along the indicated line 13—13 of FIG. 12.
Figure 14:
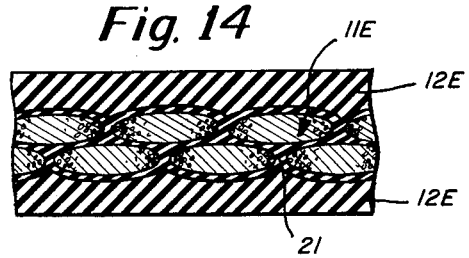
FIG. 14 is a view in cross section showing the fabric substrate of FIG. 12 provided with adhesive coats.

In FIGS. 12 and 13, two series of strands are arranged in the pattern illustrated by FIG. 11 and united to form a fabric substrate 11E by the application thereto of a flexible adhesive 21 having a wanted degree of elasticity and is then formed into the wanted material by means of adhesive coats 12E of a wanted thickness.

Although the above examples reference duct systems employing fluid flow, the invention can be used in any application which requires relative movements between two or more members due to any of several factors such as changes in temperatures, pressure or equipment vibration.

We claim:

1. An expansion joint for use in interconnecting two fluid media containing members to permit relative movement between them in response to thermal, pressure related or vibrational changes, said joint consisting of a flexible, media resistant, sheet material disposed as a sleeve and means attachable to the ends of the sections to which the margins of the sleeve are sealed, at least when said means are so attached, said sleeve then surrounding and isolating the flow path in the area between said sections, said material including at least one reinforcing fabric substrate including two series of parallel strands the orientations of which present a criss-cross pattern and with all the strands of both series diagonal with respect to the flow path, and surface layers of a flexible media resisting material having a degree of elasticity whereby said changes on the joint, urging perimetric changes of the material are accommodated by the reorientation of the substrate strands thereby allowing the material substantially throughout the length of said sleeve to stretch and recover in directions substantially normal to said flow axis.

2. The expansion joint of claim 1 in which the series of strands are woven.

3. The expansion joint of claim 1 in which threads interconnect the series of strands.

4. The expansion joint of claim 1 in which an elastomeric adhesive interconnects the strands.

5. The expansion joint of claim 1 in which the strands of the substrate consist of natural fibers.

6. The expansion joint of claim 1 in which the strands of the substrate consist of synthetic fibers.

7. The expansion joint of claim 1 in which the strands of the substrate are metallic wires.

8. The expansion joint of claim 1 in which the fabric has a diagonal weave.

9. The expansion joint of claim 1 in which the strands of the fabric consist of natural fibers.

10. The expansion joint of claim 1 in which the strands of the fabric consist of both synthetic and natural fibers.

11. The expansion joint of claim 1 in which the strands of the fabric are metallic wires interwoven.

12. The expansion joint of claim 1 in which the strands of the fabric consist of both synthetic fibers and metallic wire.

13. The expansion joint of claim 1 in which the fabric includes a third series of strands the orientation of which is such that they are in planes inclusive of the axis of the flow path.

* * * * *